United States Patent

Siegrist et al.

[15] 3,687,880

[45] Aug. 29, 1972

[54] BIS-OXAZOLES

[72] Inventors: Adolf Emil Siegrist, Weissensteinstrasse 37, Basel; Erwin Maeder, Eichbergweg 14, Aesch/Basel-Land; Peter Liechti, Hauptstrasse 121, Binningen; Leonardo Guglielmetti, Dufourstrasse 42, Basel, all of Switzerland

[22] Filed: Aug. 24, 1964

[21] Appl. No.: 391,781

[30] Foreign Application Priority Data

Aug. 29, 1963   Switzerland..............10664/63

[52] U.S. Cl..........................260/240 D, 8/65, 8/108, 8/115.5, 106/176, 106/214, 117/33.5 T, 252/102, 252/301.2 W, 260/75, 260/89.3, 260/91.3, 260/92.8, 260/94.9

[51] Int. Cl. ........................C07d 85/48, C09b 23/14

[58] Field of Search ....................260/240 CA, 240 D

[56] References Cited

UNITED STATES PATENTS 3,019,221   1/1962   Schoen et al...............260/240
3,565,890   2/1971   Tanaka...................260/240 D

*Primary Examiner*—John D. Randolph
*Attorney*—Harry Goldsmith, Joseph G. Kolodny and Bryant W. Brennan

[57] ABSTRACT

The invention concerns novel bis-azoles of the general formula

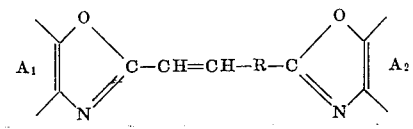

wherein R is a para-phenylene radical which may be substituted and $A_1$ and $A_2$ are benzo radicals which may be substituted.

4 Claims, No Drawings

BIS-OXAZOLES

1

The present invention provide new, valuable bis-oxazoles of the general formula (1)
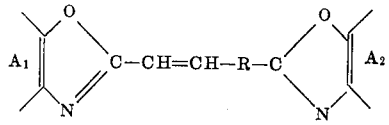

where R represents a para-phenylene radical which may be substituted, and $A_1$ and $A_2$ are identical or different and each represents a benzene radical which may be substituted and is condensed with the oxazole ring in the manner indicated by the valency lines.

From among these new bis-oxazoles of the formula (1) there may be mentioned, for example, those of the formula (2)
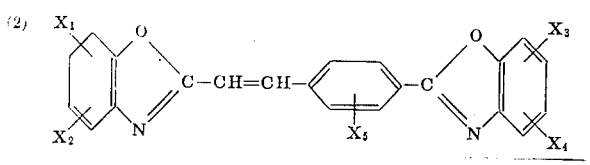

where $X_1$ and $X_3$ are identical or different and each represents a hydrogen atom, a halogen atom such as chlorine or fluorine, a phenyl group, a saturated non-aromatic hydrocarbon radical containing up to 12 carbon atoms, a phenylalkyl group, a cyanoalkyl, carboxyalkyl or carbalkoxyalkyl group containing up to 12 carbon atoms, such as cyanoethyl, cyanopropyl, carboxyethyl, carboxypropyl or carbomethoxyethyl, or a carboxylic acid, carboxylic acid ester, carboxylic acid amide or carboxylic acid hydrazide group, and $X_2$ and $X_4$ are identical or different and each represents a hydrogen atom or an alkyl group containing one to four carbon atoms, and $X_1$ and $X_2$ and/or $X_3$ and $X_4$ together with two vicinal carbon atoms of the benzene ring may also form a six-membered alicycle, and $X_5$ stands for a hydrogen atom, a halogen atom, more especially chlorine, or an alkyl group containing one to four carbon atoms.

Saturated non-aromatic hydrocarbon radicals containing up to 12 carbon atoms are the linear or branched alkyl groups of the formula (3) $—C_nH_{2n+1}$ where $n$ is a whole positive number from one to 12; furthermore cycloalkyl groups, more especially cyclohexyl; particularly suitable aralkyl radicals are, for example, phenylalkyl radicals of the formula (4)
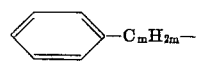

where $m = 1, 2$ or 3, and above all phenylalkyl radicals of the formula (5)
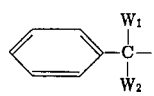

where $W_1$ and $W_2$ are identical or different and each represents a hydrogen atom or a methyl group.

From among the new bis-oxazoles of the composition defined above there may be especially mentioned those of the formula (6)
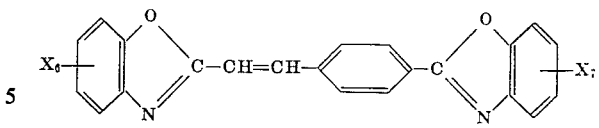

where $X_6$ and $X_7$ are identical or different and each represents a hydrogen or halogen atom, a phenyl or phenylalkyl group, a saturated non-aromatic hydrocarbon radical containing up to 12 carbon atoms, a cyanoalkyl, carboxyalkyl or carbalkoxyalkyl group containing up to 12 carbon atoms, or a carboxylic, carboxylic acid alkyl ester, carboxylic acid amide or carboxylic acid hydrazide group; furthermore the compounds of the formula (7)
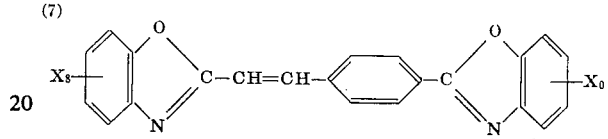

where one of the two symbols $X_8$ and $X_9$ represents a branched alkyl group containing three to 12, preferably four to eight, carbon atoms and the other is a hydrogen atom, a halogen atom especially chlorine, a linear or branched alkyl group containing up to 12 carbon atoms such as methyl, ethyl, isopropyl or tertiary butyl or phenyl group; and finally the bis-oxazoles of the formula (8)
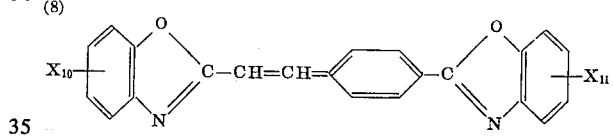

where one of the two symbols $X_{10}$ and $X_{11}$ represents a carboxyl group, a carboxylic acid alkyl ester group containing preferably two to nine carbon atoms, or a carboxylic acid amide group and the other represents a hydrogen atom, a lower alkyl group containing one to four carbon atoms such as methyl or tertiary butyl, or a carboxyl group, a carboxylic acid alkyl ester group containing preferably two to nine carbon atoms or a carboxylic acid amide group.

The new bis-oxazoles of the formula (1) can be prepared by known methods. According to one manufacturing process, for example, 1 mol of a para-carboxybenzaldehyde of the formula (9)
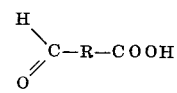

— where R represents a possibly substituted para-phenylene raidcal—is condensed with 1 mol of a 2-methylbenzoxazole of the formula

(10)
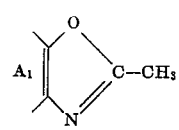

(where $A_1$ has the same meaning as in formula (1)) to form a carboxylic acid of the formula

(11)
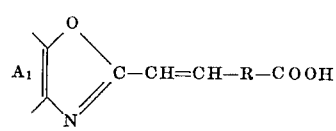

and then 1 mol of this carboxylic acid of the formula (11) is reacted with 1 mol of an ortho-hydroxyamino compound of the formula

(12) 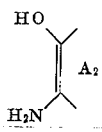

(where $A_2$ represents a possibly substituted benzene radical) at an elevated temperature, for example at 120° to 260° C and preferably in the presence of a catalyst, especially boric acid.

The two-stage process referred to above, which is particularly suitable for the manufacture of compounds in which the two benzoxazolyl radicals carry different substituents, may be represented by the following scheme of formulas:

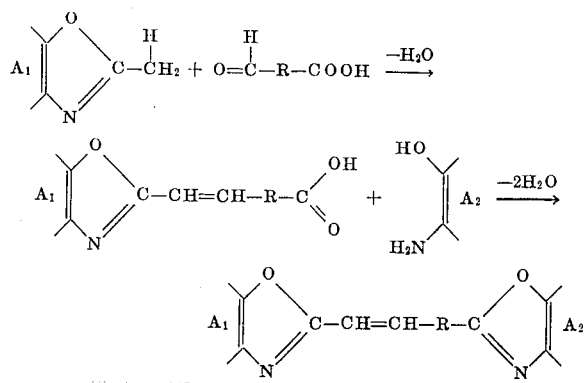

Alternatively, the new bis-oxazoles may also be prepared by reacting at least one ortho-hydroxyamino compound in the molecular ratio of 2:1 with a para-carboxycinnamic acid of the formula (13) HOOC — HC=CH — R — COOH, (where R has the meaning indicated above) at an elevated temperature, for example at 120° to 260° C and preferably in the presence of a catalyst, especially boric acid, using ortho-hydroxyamino compounds of the formulas

(14) 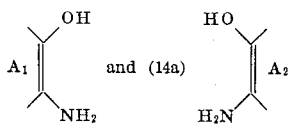 and (14a)

where $A_1$ and $A_2$ each represents a possibly substituted benzene radical. This process, which is preferably used for manufacturing compounds of the formula (1) where $A_1$ and $A_2$ are identical, may be represented schematically by the following formulas

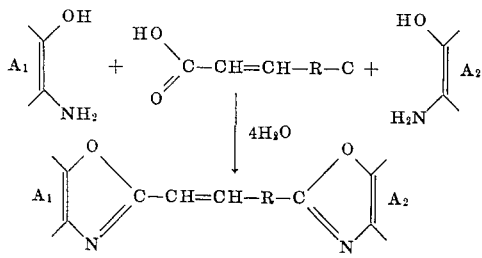

The new bis-oxazoles of the general formula (1) are valuable products suitable, for example, as intermediates for the manufacture of dyestuffs and optical brighteners, as scintillators for ultraviolet light, as sensitizers for various photographic purposes, such as electrophotographic reproduction or for supersensitizing.

In the form of finely disperse solutions the new bis-oxazoles of the composition defined above display a more or less distinct fluorescence and may be used above all for optically brightening a wide variety of organic materials. Good results are obtained, for example, in brightening acrylic resin lacquers, alkyd resin lacquers, cellulose ester lacquers, for example acetylcellulose lacquers or nitrocellulose lacquers. The new bis-oxazoles are especially suitable for optically brightening synthetic fibers, for example from cellulose esters such as cellulose propionate or acetylcellulose (cellulose diacetate or triacetate; acetate rayon), from polyamides (for example nylon) and especially those from polyesters or from polyolefines such as polyethylene and polypropylene, as well as films, foils, ribbons or shaped articles from these materials or other materials such as polystyrene, polyvinyl chloride, polyvinylidene chloride, polyvinyl alcohol or polyvinyl esters of organic acids, for example polyvinyl acetate. The new bis-oxazoles may also be used for brightening natural fibers, such, for example, as cotton and wool.

If the present process is to be used for optically brightening fibers — which may be in the form of staple fibers or filaments, in the crude state or in the form of hanks or woven fabrics — it is advantageously carried out in an aqueous medium in which the compounds concerned are suspended. If desired, the treating liquors may further contain a dispersant, for example soaps, polyglycol ethers of fatty alcohols, fatty amines or alkylphenols, cellulose sulfite waste liquor or condensation products of formaldehyde with (possibly alkylated) naphthalenesulfonic acids. It has been found to be especially advantageous to work in a neutral, weakly alkaline or acid bath. Likewise, it is advantageous to perform the treatment at an elevated temperature from about 50° to 100° C for example at the boiling temperature of the bath or near it (at about 90° C). The improvement according to this invention can also be achieved with solutions in organic solvents.

The new bis-oxazoles to be used in the present process may also be added to, or incorporated with, the materials before or during their shaping. Thus, they may be added to the moulding compositions used for the manufacture of films, foils, ribbons or shaped articles, or they may be dissolved or finely dispersed in the spinning mass before spinning. The new brighteners may also be added to the reaction mixtures before or during the poly-condensation leading, for example, to polyamides or polyesters, or before or during the polymerization of monomers, for example vinyl acetate or styrene, to the polymerization masses.

The new bis-oxazoles are distinguished by their especially good thermostability.

The proportion of the new bis-oxazoles to be used, referred to the weight of the material to be optically brightened, may vary within wide limits. Even a very small amount, in certain cases for instance as little as 0.01%, may produce a distinct and durable effect. It is, however, also possible to use an amount of up to about 1%.

The new bis-oxazoles may be used as brighteners also as follows:

a. In admixture with dyestuffs or pigments or as additives to dyebaths, or printing, discharge or resist pastes.

Furthermore also for after-treating dyeings, prints or discharge effects.

b. In admixture with chemical bleaches or as additives to bleaching baths.

c. In admixture with dressing agents such as starch or synthetic dressings. The products of this invention may also be used with advantage to produce a crease-resistant finish by adding them to the liquors used for this purpose.

d. In combination with detergents. The detergents and brighteners may be added to the washing liquors separately. It is also of advantage to use detergents that as such contain the brightener. Suitable detergents are, for example, soaps, salts of sulfonate detergents, for example of sulfonated benzimidazoles substituted on the two-carbon atom by higher alkyl radicals; also salts of monocarboxylic acid esters of the 4-sulfophthalic acid with higher fatty alcohols; also salts of fatty alcohol sulfonates, alkyl-aryl-sulfonic acids or condensation products of higher fatty acids with aliphatic hydroxysulfonic or aminosulfonic acids. Furthermore, there may be used nonionic detergents, for example polyglycol ethers derived from ethylene oxide and higher fatty alcohols, alkylphenols or fatty amines.

If the present process is combined with other treatment or improving operations, the combined treatment is advantageously carried out with the aid of suitable preparations. These stable preparations contain compounds of the above formula (1) as well as dispersants, detergents, dyestuffs, pigments or dressing agents.

The compounds of the above formula (1) may also be used after having been fixed on a finely dispersed vehicle.

Parts and percentages in the following Examples are by weight unless otherwise indicated.

EXAMPLE 1

4.30 Parts of ω-[benzoxazolyl-(2′)]-styrene-4-carboxylic acid of the formula

(15)
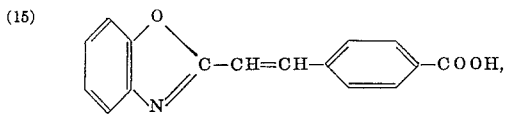

2.52 parts of 1-hydroxy-2-amino-4-methylbenzene and 0.3 part of boric acid in 40 parts by volume of diethylcarbitol are stirred under a current of nitrogen.

The reaction mixture is heated within 1 hour to 185° to 190° C, during which water escapes, and then stirred for about one hour longer at the same temperature. In the course of 1 to 1 ½ hours the temperature of the reaction mixture is raised to 230° to 240° C, so that the bulk of the solvent passes over drop by drop. The initially yellowish suspension turns gradually into a clear, yellow brown melt which is stirred for about 30 to 60 minutes at 230° to 240° C.

The batch is allowed to cool to about 180° to 200° C, and 50 parts by volume of dimethyl formamide are dropped into the melt, whereupon a clear yellow solution is formed. After further cooling, 100 parts by volume of methanol are added and the resultant yellow precipitate is cooled to room temperature, section-filtered, washed with about 50 parts by volume of methanol and dried.

Yield: about 4.8 parts, corresponding to 68.2% of theory, of ω-[benzoxazolyl-(2′)]-4-[5′′′-methylbenzoxazolyl-(2′′)]-styrene of the formula

(16)
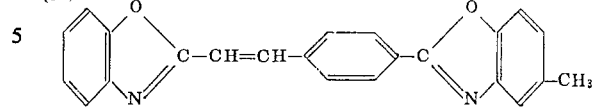

in the form of a light yellow powder which melts at 255° to 256° C. After three recrystallizations from tetrachlorethylene with the aid of bleaching earth there are obtained light yellow, very fine needles melting at 262° to 262.5° C.

| Analysis: $C_{23}H_{16}O_2N_2$ | | C | H | N |
|---|---|---|---|---|
| Molecular weight: 352.37 | calculated | 78.39 | 4.58 | 7.95% |
| | found: | 78.62 | 4.65 | 8.00%. |

The ω-[benzoxazolyl-(2′)]-styrene-4-carboxylic acid of the formula (15) used as starting material may be prepared thus:

A mixture of 30.4 parts of terephthalic aldehyde acid (para-carboxybenzaldehyde), 26.6 parts of 2-methylbenzoxazole and 5 parts of boric acid is heated with exclusion of air within 1 ½ to 2 hours to about 190° C and then maintained for another 2 to 3 hours at 190° to 210° C until all water of reaction has been expelled. The reaction product is dissolved in 150 parts by volume of dimethyl formamide and then diluted with 150 parts by volume of methanol, cooled to about 10° C and the resulting yellow precipitate is suctioned off, washed with methanol and dried.

After three recrystallizations from dioxane, ω-[benzoxazolyl-(2′)]-styrene-4-carboxylic acid of the formula (15) is obtained in the from of yellowish prisms melting at 330° to 331° C.

| Analysis: $C_{16}H_{11}O_3N$ | | C | H |
|---|---|---|---|
| Molecular weight: 265.26 | calculated: | 72.44 | 4.18% |
| | found: | 72.27 | 4.18%. |

The following dibenzoxazolyl-styrene compounds are accessible in an analogous manner:

(17)
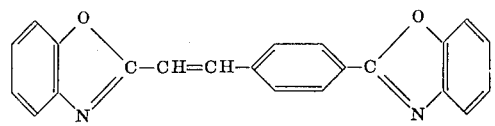

Yield: 59.2% of theory. Light-yellow, shiny crystals from tetrachlorethylene, melting at 321° C.

| Analysis: $C_{22}H_{14}O_2N_2$ | | C | H | N |
|---|---|---|---|---|
| Molecular weight 338.35 | calculated: | 78.09 | 4.17 | 8.28% |
| | found: | 77.90 | 4.26 | 8.10%. |

(18)
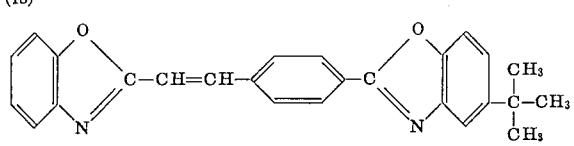

Yield: 66.1% of theory. Pale greenish-yellow crystalline powder from dioxane+ethanol+water, melting at 237° to 238° C.

| Analysis: $C_{26}H_{22}O_2N_2$ | | C | H | N |
|---|---|---|---|---|
| Molecular weight: 294.45 | calculated: | 79.16 | 5.62 | 7.10% |
| | found: | 79.23 | 6.01 | 6.79%. |

(19)

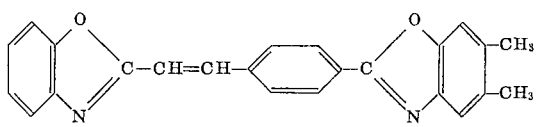

Yield: 69.8% of theory. Light-yellow, very fine needles from tetrachlorethylene, melting at 308° to 309° C.

| Analysis: $C_{24}H_{19}O_2N_2$ | | C | H | N |
|---|---|---|---|---|
| Molecular weight: | calculated: | 78.76 | 4.95 | 7.65% |
| 366.40 | found: | 78.39 | 5.08 | 7.26%. |

(20)

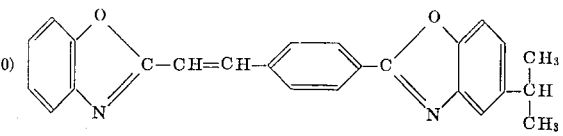

Yield: 54% of theory. Pale yellow, finely crystalline powder from tetrachlorethylene+alcohol, melting at 186° to 187.6° C.

| Analysis: $C_{25}H_{20}O_2N_2$ | | C | H | N |
|---|---|---|---|---|
| Molecular weight: | calculated: | 78.92 | 5.30 | 7.36% |
| 380.43 | found: | 78.97 | 5.53 | 7.39%. |

(21)

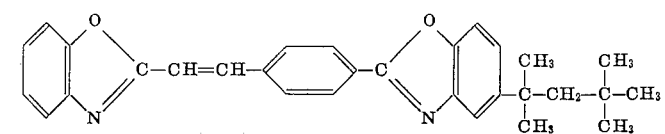

Yield: 62.2% of theory. Pale-yellow, finely crystalline powder from cyclohexane, melting at 254° to 255° C.

| Analysis: $C_{30}H_{30}O_2N_2$ | | C | H | N |
|---|---|---|---|---|
| Molecular weight: | calculated: | 79.97 | 6.71 | 6.22% |
| 450.56 | found: | 79.56 | 6.71 | 6.11%. |

(22)

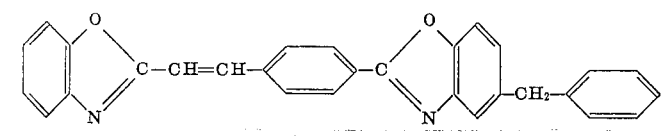

Yield: 63.5%. Light yellow, finely crystalline powder from perchlorethylene, melting at 228° to 230° C.

| Analysis: $C_{29}H_{20}O_2N_2$ | | C | H | N |
|---|---|---|---|---|
| Molecular weight: | calculated: | 81.29 | 4.71 | 6.54% |
| 428.466 | found: | 81.45 | 4.83 | 6.44%. |

EXAMPLE 2

A mixture of 5.58 parts of ω-[5'-methylbenzoxazolyl-(2')]-styrene-4-carboxylic acid of the formula (23)

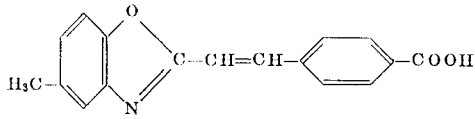

2.20 parts of 1-hydroxy-2-aminobenzene and 0.3 part of boric acid in 40 parts by volume of diethylcarbitol and 20 parts by volume of dibutylcarbitol is stirred under nitrogen.

The reaction mixture is heated within one hour to 185° to 190° C, during which water escapes, and then stirred on for about one hour at the same temperature. In the course of 1 to 1 ½ hours the temperature of the reaction mixture is raised to 240° C so that the bulk of the solvent passes over drop by drop. The initially brown suspension turns gradually into a clear, dark solution which is then stirred on for about 1 hour at 240° to 245° C.

After cooling to about 180° to 200° C, 25 parts by volume of dimethyl formamide are added dropwise to the solution. After further cooling, 100 parts by volume of methanol are added, and the resulting yellowish brown precipitate is cooled to room temperature (about 18° C), suctioned, washed with about 100 parts by volume of methanol and dried.

Yield: about 5.6 parts (= 80% of the theoretical) of ω-]5'-methyl-benzoxazolyl-(2')]-4 -[benzoxazolyl-(2'')]-styrene of the formula (24)

in the form of a light brown powder which melts at 245.6° to 247° C. After crystallization from tetrachlorethylene with the use of bleaching earth and two recrystallizations from dioxane+alcohol, there are obtained light yellow, very fine, shin needles melting at 262° to 262.5° C.

| Analysis $C_{23}H_{16}O_2N_2$ | | C | H | N |
|---|---|---|---|---|
| Molecular weight: | calculated: | 78.39 | 4.58 | 7.95% |
| 352.37 | found: | 78.58 | 4.74 | 7.93%. |

The ω-[5'-methyl-benzoxazolyl-(2')]-styrene-4-carboxylic acid of the formula (23) used as starting material can be manufactured thus:

A mixture of 45.6 parts of 4-carboxybenzaldehyde, 50 parts of 2,5-dimethylbenzoxazole and 7.5 parts of boric acid is heated with exclusion of air within 1 ½ to 2 hours to about 200° C and then for another 2 to 3 hours at 200° to 220° C to remove all water of reaction. The reaction product is dissolved in 50 parts by volume of dimethyl formamide, the solution is diluted with 150 parts by volume of methanol, cooled to about 10° C, and the resulting yellow precipitate is suctioned off, washed with methanol and dried. Yield: about 21 parts, corresponding to 32% of the theoretical.

Crystallization from dioxane, while decolorizing with active carbon, yields the ω-[5'-methyl-benzoxazolyl-(2')]-styrene-4-carboxylic acid of the formula (23) as a pale yellow, crystalline precipitate melting at 325.4° to 325.6° C.

| Analysis: $C_{17}H_{13}NO_3$ | | C | H | N |
|---|---|---|---|---|
| Molecular weight: | calculated: | 73.11 | 4.69 | 5.02% |
| 279.282 | found: | 72.88 | 4.79 | 5.11%. |

The following dibenzoxazolyl compounds may be manufactured in an analogous manner:

(25) 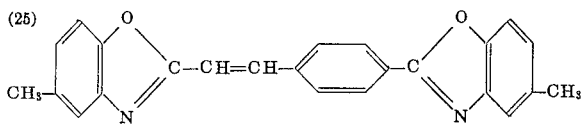

Yield: 80.5% of the theoretical. Light yellow, shiny, felted needles from tetrachlorethylene, melting at 267.4° to 267.6° C.

Analysis: C₂₄H₁₈O₂N₂ 
Molecular weight: 366.40

| | C | H | N |
|---|---|---|---|
| calculated: | 78.67 | 4.95 | 7.65% |
| found: | 78.93 | 5.14 | 7.40% |

(26) 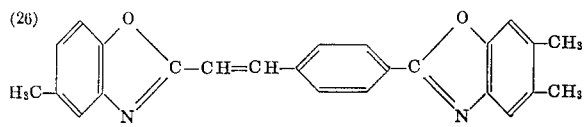

Yield: 75% of the theoretical. Light yellow, very fine needles from tetrachlorethylene, melting at 324.2° to 324.7° C.

Analysis: C₂₅H₂₀O₂N₂ 
Molecular weight: 380.43

| | C | H | N |
|---|---|---|---|
| calculated: | 78.92 | 5.30 | 7.36% |
| found: | 78.91 | 5.19 | 7.21% |

(27) 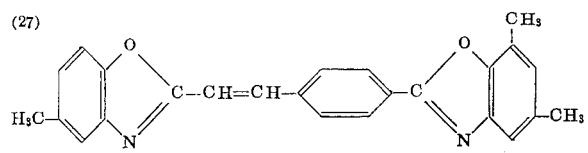

Yield: 60.5% of the theoretical. Light yellow, very fine needles from tetrachlorethylene, melting at 250° to 251° C.

Analysis: C₂₅H₂₀O₂N₂ 
Molecular weight: 380.43

| | C | H | N |
|---|---|---|---|
| calculated: | 78.92 | 4.30 | 7.36% |
| found: | 78.58 | 5.28 | 7.52% |

(28) 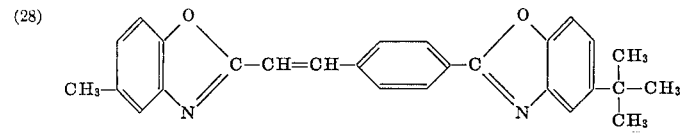

Yield: 67.3% of the theoretical. Light greenish yellow, shiny needles from dioxane+alcohol, melting at 232.2° to 232.4° C.

Analysis: C₂₇H₂₄O₂N₂ 
Molecular weight: 408.48

| | C | H | N |
|---|---|---|---|
| calculated: | 79.38 | 5.92 | 6.86% |
| found: | 79.39 | 5.97 | 6.79% |

(29) 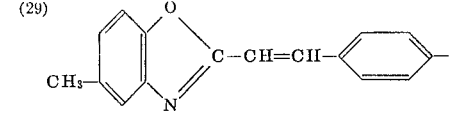

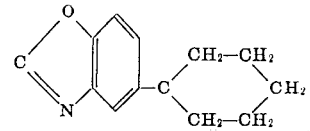

Yield: 77.7% of the theoretical. Light yellow, shiny, felted needles from dioxane+alcohol, melting at 223.5° to 224° C.

Analysis: C₃₂H₂₆O₂N₂ 
Molecular weight: 470.54

| | C | H | N |
|---|---|---|---|
| calculated: | 81.68 | 5.57 | 5.95% |
| found: | 81.40 | 5.64 | 5.74% |

(30) 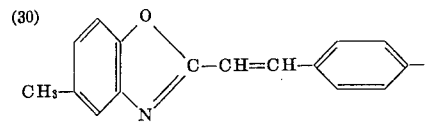

Yield: 70.4% of the theoretical. Light yellow, very fine crystals from dioxane+alcohol, melting at 206° to 208° C.

Analysis: C₂₉H₂₆O₂N₂ 
Molecular weight: 434.51

| | C | H | N |
|---|---|---|---|
| calculated: | 80.16 | 6.08 | 6.45% |
| found: | 80.41 | 6.24 | 6.34% |

EXAMPLE 3

A mixture of 6.42 parts of ω-[5'-tertiary butyl-benzoxazolyl-(2')]-styrene-4-carboxylic acid of the formula

(31) 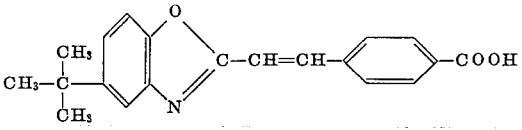

2.98 parts of 1-hydroxy-2-amino-4-chlorobenzene, 0.3 part of boric acid, 40 parts by volume of diethylcarbitol and 20 parts by volume of dibutylcarbitol is stirred under nitrogen. The reaction mixture is heated within 1 hour to 185° to 190° C, during which water is liberated, and then stirred on for about 1 hour at the same temperature. Within 1 to 1 ½ hours the temperature of the reaction mixture is raised to 245° C, so that the bulk of the solvent passes over drop by drop. The initially brown suspension gradually turns into a clear, dark solution which is stirred on for about one hour at 245° to 250° C. After cooling to about 200° C, 25 parts by volume of dimethyl formamide are dropped into the solution. The resulting suspension is further cooled and at 100° C diluted with 50 parts by volume of methanol, cooled to 0°C, suction-filtered and the precipitate is washed with 100 parts by volume of methanol and dried.

Yield: about 4.6 parts ( = 53.7% of theory) of ω-[5'-tertiary butyl-benzoxazolyl-(2')]-4-]5''-chloro-benzoxazolyl-(2'')]-styrene of the formula

(32) 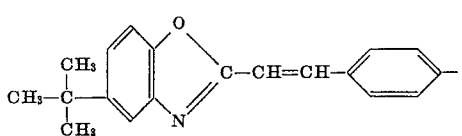

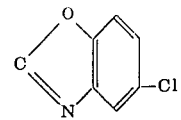

in the form of a brown, crystalline powder melting at 252.5° to 253.5° C. Two recrystallizations from tetrachlorethylene, while decolorizing with bleaching earth, produce a light yellow, finely crystalline powder melting at 260° to 260.5° C.

Analysis: $C_{26}H_{21}O_2N_2Cl$  
Molecular weight: 428.92  
calculated: C 72.81, H 4.94, N 6.53%  
found: C 72.57, H 4.96, N 6.61%.

The ω-[5'-tertiary butyl-benzoxazolyl-(2')]-styrene-4-carboxylic acid of the formula (31) used as starting material can be prepared thus:

A mixture of 28 parts of 4-carboxybenzaldehyde, 35.6 parts of 2-methyl-5-tertiary butyl-benzoxazole, 4 parts of boric acid and 20 parts by volume of chlorobenzene is stirred under nitrogen. In the course of one hour the reaction mixture is heated to 200° C, during which chlorobenzene and water pass over. The batch is stirred for another 2 to 3 hours at 200° to 205° C, until all water of reaction has been expelled, and a thick suspension has formed which is hard to stir. The mixture is then diluted with 25 parts by volume of dimethyl formamide, then with 150 parts by volume of methanol and allowed to cool to room temperature (about 18° C). After suctioning, thoroughly washing the precipitate with methanol and drying, there are obtained about 25 parts of ω-[5'-tertiary butyl-benzoxazolyl-(2')]-styrene-4-carboxylic acid of the formula (31) in the form of a yellowish crystalline powder melting at 299° to 300° C. Two recrystallizations from dioxane, while decolorizing with active carbon, yield yellowish, shiny flakes melting at 302° to 303° C.

Analysis: $C_{20}H_{19}O_3N$  
Molecular weight: 321.36  
calculated: C 74.74, H 5.96, N 4.36%  
found: C 74.70, H 5.81, N 4.44%.

The following dibenzoxazolyl-styrene compounds are obtained in an analogous manner:

(33)
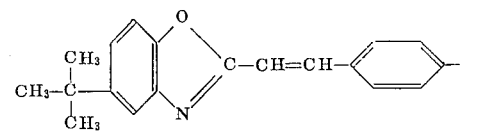
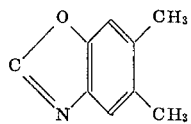

Yield: 61.6% of the theoretical. Light yellow, finely crystalline powder from tetrachlorethylene, melting at 257.0° to 257.2° C.

Analysis: $C_{28}H_{26}O_2N_2$  
Molecular weight: 422.504  
calculated: C 79.59, H 6.20, N 6.63%  
found: C 79.46, H 6.11, N 6.63%.

(34)
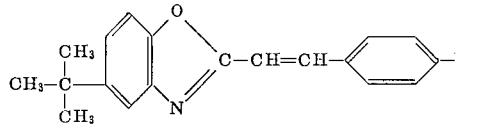
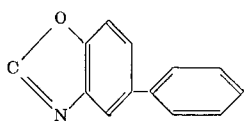

Yield: 62.8% of the theoretical. Light yellow, fine needles from tetrachlorethylene, melting at 239.6° to 240° C.

Analysis: $C_{32}H_{26}O_2N_2$  
Molecular weight: 470.544  
calculated: C 81.68, H 5.57, N 5.95%  
found: C 81.97, H 5.47, N 6.03%.

(35)
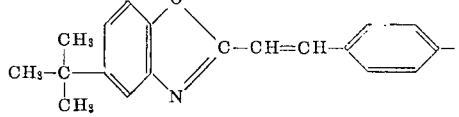
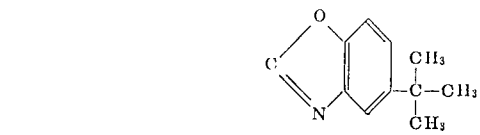

Yield: 72% of the theoretical. Pale yellow tinsel from toluene, melting at 258.5° to 259° C.

Analysis: $C_{30}H_{30}O_2N_2$  
Molecular weight: 450.56  
calculated: C 79.97, H 6.71, N 6.22%  
found: C 79.92, H 6.61, N 6.28%.

(36)
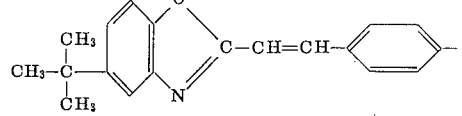
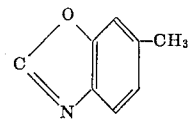

Yield: 62.5% of the theoretical. Yellowish needles from toluene+ethanol, melting at 201° to 202° C.

Analysis: $C_{27}H_{24}O_2N_2$  
Molecular weight: 408.48  
calculated: C 79.38, H 5.92, N 6.86%  
found: C 79.04, H 5.90, N 6.86%.

EXAMPLE 4

22.5 Parts of ω-[5'-tertiary butyl-benzoxazolyl-(2')]-styrene-4-carboxylic acid of the formula (31) are stirred in 150 parts by volume of xylene. 20 Parts of thionyl chloride and 3 drops of dimethyl formamide are added, and the reaction mixture is stirred for 10 hours at 80° to 85° C, during which hydrochloric acid gas escapes, and a clear, reddish solution forms. The excess thionyl chloride is then evaporated under atmospheric pressure and the solution cooled to room temperature (about 18° C). 11.7 Parts of 1-hydroxy-2-amino-4-carbomethoxybenzene are then added and the whole is raised to the reflux temperature within 1 hour, during which hydrochloric acid gas escapes. To complete the reaction the batch is refluxed for another 8 hours, whereupon 100 parts by volume of xylene are evaporated under atmospheric pressure. 50 Parts by volume of dibutylcarbitol are added and the remaining xylene is evaporated, and within 1 hour the temperature of the reaction mixture is raised to 240° C. To complete the reaction the whole is heated for another hour at 240° to 245° C. The dark solution is cooled to 100° C, 150 parts by volume of methanol are added dropwise and the batch is allowed to cool to room temperature (about 18° C). The brown precipitate is suctioned off and rinsed with 100 parts by volume of methanol. After drying, the crude product is dissolved in 300 parts by volume of methylene chloride, filtered through 350 parts of activated alumina and rinsed with methylene chloride. On evaporation of the solvent there remain about 17.4 parts, corresponding to 55% of theory, of a beige-colored residue melting at 217° to 219° C.

Repeated recrystallization from carbon tetrachloride yields the compound of the formula (37)

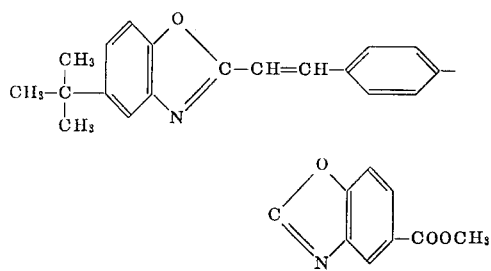

as pale yellow needles melting at 229° to 230° C.

Analysis: $C_{28}H_{24}O_4N_2$
Molecular weight:    calculated:    C 74.32    H 5.35    N 6.19%
452.49    found:    74.48    5.24    6.29%.

In an analogous manner the following di-benzoxazolyl-styrene compound can be prepared from ω-[5'-methyl-benz-oxazolyl-(2')]-styrene-4-carboxylic acid of the formula (23) and 3-amino-4-hydroxybenzoic acid-(2'-ethyl)-hexyl ester:

(38)

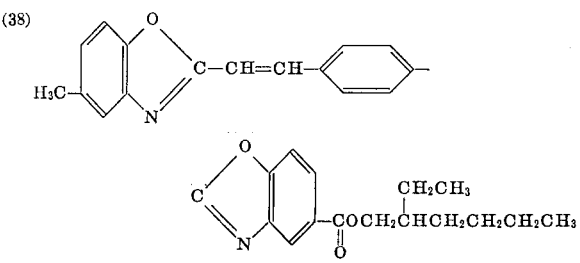

Yield: 49 % of theory. Pale yellow, bunched needles from carbon tetrachloride, melting at 240° C.

Analysis: $C_{32}H_{32}O_4N_2$
Molecular weight:    calculated:    C 75.57    H 6.34    N 5.51%
508.59    found:    75.25    6.23    5.44%.

EXAMPLE 5

2 Parts of the dibenzoxazolyl-styrene compound of the formula (37) are finely comminuted and stirred in a solution of 4 parts of sodium hydroxide in 10 parts by volume of water and 90 parts by volume of methanol for 2 ½ hours under reflux. The yellowish, floccular suspension is then cooled to room temperature (about 18° C), suction-filtered and the residue is washed with 100 parts by volume of methanol.

The moist sodium salt of the formula (39)

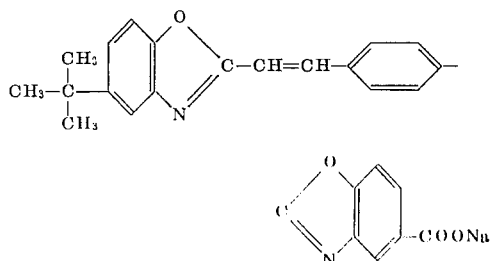

is then pasted with a small amount of water and a wetting agent, and the resulting paste dispersed in 500 parts of boiling water. In the course of 30 minutes under reflux, hydrochloric acid of 10% strength is added until the Congo acid reaction persists. The granular precipitate is then suctioned off at room temperature and washed neutral with water.

After drying, there are obtained about 1.8 parts, corresponding to 93% of theory, of a pale yellow powder melting at 300° to 302° C.

Two recrystallizations from dioxane+toluene produce the compound of the formula (40)

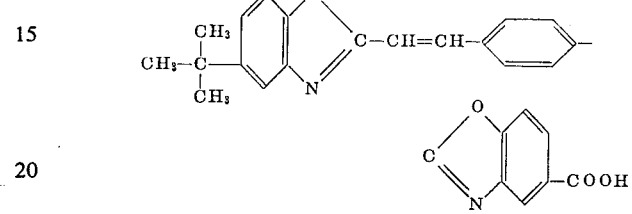

compound of the formula (38) and 15 parts by volume of n-octylamine is refluxed for 24 hours, whereupon a in the form of yellowish needles melting at 316° to 317° C.

Analysis: $C_{27}H_{22}O_4N_2$
Molecular weight:    calculated:    C 73.96    H 5.06    N 6.39%
438.46    found:    73.71    5.06    6.44%.

EXAMPLE 6

A mixture of 2.2 parts of the dibenzoxazolyl-styrene dark solution is obtained; it is allowed to cool to about 100° C, and the reaction product is precipitated with 50 parts by volume of methanol, suctioned off at room temperature and rinsed with 25 parts by volume of methanol. Yield: about 1 part of a pale yellow powder (corresponding to 45.4% of the theoretical). Repeated crystallization from toluene yields the product of the formula (41)

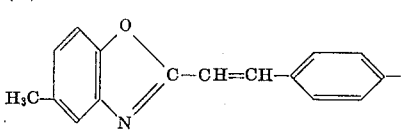

in the form of pale yellow, very fine needles melting at 281° to 283° C.

Analysis: $C_{32}H_{33}O_3N_3$
Molecular weight:    calculated:    C 75.71    H 6.55    N 8.28%
507.61    found:    75.42    6.43    8.37%.

EXAMPLE 7

100 Parts of a polyamide fabric (for example "nylon spun") are immersed at 60°C in a bath consisting of
    4,000 parts of water,
    8 parts of a dispersant (adduct from 35 mols of ethylene oxide with 1 mol of octadecyl alcohol) and
    0.1 part of the dibenzoxazolyl-styrene compound of the formula (16).

The bath is then raised to the boil, and the fabric is treated for 1 hour at the boil, then rinsed and dried. The fabric treated in this manner has a substantially higher white content than the untreated fabric.

When in this Example a polyester fabric instead of a polyamide fabric is treated, very good brightening effects are likewise achieved.

EXAMPLE 8

100 Parts of polyester granulate from polyterephthalic acid ethyleneglycol ester are intimately mixed with 0.05 part of the compound of the formula (37), and the whole is stirred and heated at 285° C until it has melted. The spinning composition is spun through conventional spinnerets, whereupon strongly brightened polyester fibers are obtained.

When the compound of the formula (37) is replaced by the compound of the formula (38) or (40), a similar brightening effect is obtained.

EXAMPLE 9

10,000 Parts of a polyamide in chip form, prepared in the known manner from hexamethylenediamine adipate, are mixed for 12 hours in a tumbler with 30 parts of titanium dioxide (rutil modification) and 10 parts of the compound of the formula (37). The chips treated in this manner are then melted in a boiler heated with oil or diphenyl vapor at 300° to 310° C after displacement of the atmospheric oxygen with superheated steam, and the melt is stirred for half an hour. The melt is then expressed through a spinneret under a nitrogen pressure of 5 atmospheres (gauge), and the resulting filament is cooled and wound on a spinning bobbin. The filaments thus obtained display an excellent brightening effect which is fast to thermosetting and has good properties of fastness to washing and light.

When the compound of the formula (37) is replaced by the compound of the formula (38) or (40), a similar brightening effect is achieved.

EXAMPLE 10

Polypropylene fibers are treated at a goods-to-liquor ratio of 1:40 with 0.1% of the compound of the formula (16) for 60 minutes at 60° to 100° C in a bath containing per liter 5 g of an adduct from about 35 mols of ethylene oxide with 1 mol of octadecyl alcohol, and 0.5 g of trisodium phosphate. The material is then rinsed and dried. The polypropylene fibers obtained in this manner have a substantially higher white content than the untreated material.

When 1 g of 85 % formic acid is used instead of 0.5 g of trisodium phosphate, a similar effect is achieved.

EXAMPLE 11

Polyethylene fibers are treated at a goods-to-liquor ratio of 1:40 with 0.1% of the compound of the formula (16) for 60° to 100° C in a bath containing per liter 5g of an adduct from about 35 mols of ethylene oxide with 1 mol of octadecyl alcohol, and 0.5 g of trisodium phosphate. The material is then rinsed and dried. The polyethylene fibers obtained in this manner possess a substantially higher white content than the untreated fibers.

When 1 g of 85 % formic acid is used instead of 0.5 g of trisodium phosphate, a similar effect is achieved.

EXAMPLE 12

100 Parts of polyethylene are rolled to and fro on a warm calender to form a homogeneous foil, in which 0.02 part of the compound of the formula (25) is incorporated. The foil is pulled off the calender and pressed between steel platens heated at 130° to 135° C, to produce a smooth surface on both sides of the foil.

The polyethylene foil obtained in this manner has a substantially higher white content than a foil that does not contain the compound of the formula (25).

When the compound of the formula (25) is replaced by an equal amount of the compound of the formula (16) or (17) or (21), a similar brightening effect is achieved.

EXAMPLE 13

100 Parts of polyethylene ("Alkathene WNG 14") are rolled on a warm calender to form a homogeneous foil, in which 0.02 to 0.08 part of the compound of the formula (35) and 0.5 part of titanium dioxide are incorporated. The foil is pulled off the calender and then pressed between two steel platens heated at 130° to 135° C, to produce a smooth surface on both sides of the foil.

The resulting opaque polyethylene foil has a substantially higher white content than a foil that does not contain the compound of the formula (35).

EXAMPLE 14

100 Parts of polyethylene (Alkathene WNG 14) are rolled on a calender heated at 130° C to form a homogeneous foil in which 0.02 part of the compound of the formula (24) or 0.02 part of the formula (28) are slowly incorporated. After 5 minutes the foil is pulled off the calender and pressed to form a panel on a press heated at 130° to 135° C.

The resulting polyethylene material possesses a substantially higher white content than when it does not contain the compound of the formula (24) or (28).

Similar brightening effects are obtained, when the compound of the formula (24) or (28) is replaced by an equal amount of the compound of the formula (29) or (30).

EXAMPLE 15

Polyvinylidene chloride fibers are treated at a goods-to-liquor ratio of 1:40 with 0.05% of the compound of the formula (16) for 60 minutes at 50° to 95° C in a bath containing per liter 2 g of an adduct from about 35 mols of ethylene oxide with 1 mol of octadecyl alcohol (as dispersant). The material is then rinsed and dried. The resulting polyvinylidene chloride fibers have a substantially higher white content than the untreated fibers.

When the compound of the formula (16) is replaced by the compound of the formula (17), a similar brightening effect is achieved.

EXAMPLE 16

An intimate mixture of 100 parts of polyvinyl chloride, 54 parts of dioctyl phthalate and 0.1 part of the dibenzoxazolyl-styrene compound of the formula (25) is rolled on a calender heated at 150° to 160° C for about 6 minutes to form a foil.

The polyvinyl chloride foil obtained in this manner has a substantially higher white content than a foil that does not contain the styrene compound.

Similar brightening effects are obtained by using instead of the compound of the formula (25) an equal amount of the compound of the formula (35).

What is claimed is:

1. A bis-oxazole of the formula

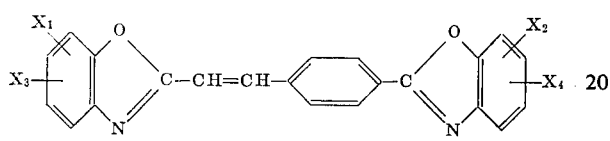

wherein $X_1$ and $X_2$ each represents a member selected from the group consisting of a hydrogen atom and a lower alkyl group and one of the two symbols $X_3$ and $X_4$ is a member selected from the group consisting of a carboxylic acid alkyl ester group with at most nine carbon atoms and a mono-alkyl carboxamide group with up to eight carbon atoms in the alkyl group, and the other is a member selected from the group consisting of hydrogen and lower alkyl.

2. A bis-oxazole of the formula

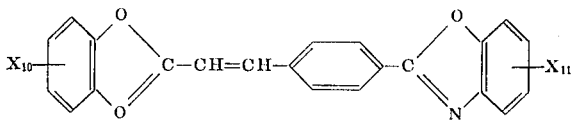

wherein one of the two symbols $X_{10}$ and $X_{11}$ is carbalkoxy with at most nine carbon atoms, and the other is a member selected from the group consisting of hydrogen and lower alkyl.

3. The compound of the formula

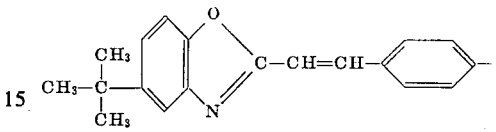

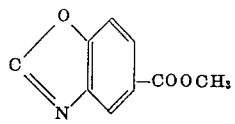

4. The compound of the formula

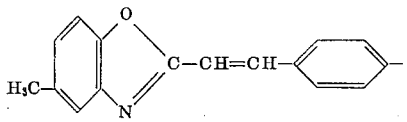

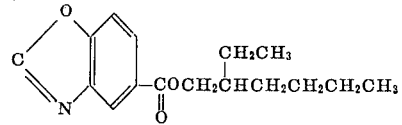

* * * * *

PO-1050
(5/69)

UNITED STATES PATENT OFFICE
CERTIFICATE OF CORRECTION

Patent No. 3,687,880          Dated August 29, 1972

Inventor(s) Adolf Emil Siegrist et al

It is certified that error appears in the above-identified patent and that said Letters Patent are hereby corrected as shown below:

Column 1, insert the Assignee as follows:

--- CIBA-GEIGY AG, Basel, Switzerland ---

Signed and sealed this 18th day of June 1974.

(SEAL)
Attest:

EDWARD M. FLETCHER, JR.
Attesting Officer

C. MARSHALL DANN
Commissioner of Patents